US009537718B2

(12) United States Patent
Bashandy et al.

(10) Patent No.: US 9,537,718 B2
(45) Date of Patent: Jan. 3, 2017

(54) SEGMENT ROUTING OVER LABEL DISTRIBUTION PROTOCOL

(71) Applicant: Cisco Technology, Inc., San Jose, CA (US)

(72) Inventors: Ahmed R. Bashandy, Milpitas, CA (US); Clarence Filsfils, Bruselles (BE); David D. Ward, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 126 days.

(21) Appl. No.: 14/096,358

(22) Filed: Dec. 4, 2013

(65) Prior Publication Data
US 2014/0269721 A1 Sep. 18, 2014

Related U.S. Application Data

(60) Provisional application No. 61/791,242, filed on Mar. 15, 2013.

(51) Int. Cl.
*H04L 12/723* (2013.01)
*H04L 12/24* (2006.01)
*H04L 12/721* (2013.01)
*H04L 12/715* (2013.01)
*H04L 12/741* (2013.01)

(52) U.S. Cl.
CPC ............... *H04L 41/12* (2013.01); *H04L 45/04* (2013.01); *H04L 45/12* (2013.01); *H04L 45/46* (2013.01); *H04L 45/50* (2013.01); *H04L 45/507* (2013.01); *H04L 45/74* (2013.01); *H04L 45/745* (2013.01); *H04L 45/54* (2013.01)

(58) Field of Classification Search
CPC ............... H04L 45/505; H04L 12/5601; H04L 2012/5667; H04L 2012/5669; H04L 45/00; H04L 2012/563; H04L 49/602; H04L 49/309
See application file for complete search history.

(56) References Cited

U.S. PATENT DOCUMENTS

| | | | |
|---|---|---|---|
| 6,032,197 A | 2/2000 | Birtwell | 709/216 |
| 6,374,303 B1 | 4/2002 | Armitage et al. | 709/242 |
| 6,577,600 B1 | 6/2003 | Bare | 370/238 |
| 6,647,428 B1 * | 11/2003 | Bannai | H04L 29/12009 370/253 |
| 6,963,570 B1 | 11/2005 | Agarwal | 370/310.2 |
| 7,023,846 B1 | 4/2006 | Andersson et al. | 370/389 |

(Continued)

OTHER PUBLICATIONS

Aggarwal, R. and Y. Rekhter, Juniper Networks; E. Rosen, Cisco Systems, Inc.; "MPLA Upstream Label Assignment and Context Specific Label Space;" Network Working Group; Internet Draft; Jan. 2005; pp. 1-8.

(Continued)

*Primary Examiner* — Jung-Jen Liu
(74) *Attorney, Agent, or Firm* — Campbell Stephenson LLP

(57) ABSTRACT

An apparatus and method is disclosed for segment routing (SR) over label distribution protocol (LDP). In one embodiment, the method includes a node receiving a packet with an attached segment ID. In response, the node may attach a label to the packet. Thereafter, the node may forward the packet with the attached label and segment ID to another node via a label switched path (LSP).

20 Claims, 10 Drawing Sheets

(56) References Cited

U.S. PATENT DOCUMENTS

| | | | |
|---|---|---|---|
| 7,031,253 B1 | 4/2006 | Katukam et al. | 370/222 |
| 7,031,607 B1 | 4/2006 | Aswood Smith | 398/51 |
| 7,061,921 B1 | 6/2006 | Sheth | 370/395.52 |
| 7,068,654 B1 | 6/2006 | Joseph et al. | 370/392 |
| 7,072,346 B2 | 7/2006 | Hama | 370/395.53 |
| 7,088,721 B1 | 8/2006 | Droz et al. | 370/395.1 |
| 7,154,416 B1 | 12/2006 | Savage | 341/51 |
| 7,174,387 B1 | 2/2007 | Shand et al. | 709/238 |
| 7,180,887 B1 | 2/2007 | Schwaderer | 370/351 |
| 7,260,097 B2 | 8/2007 | Casey | 370/392 |
| 7,286,479 B2* | 10/2007 | Bragg | H04L 45/00 370/225 |
| 7,330,440 B1 | 2/2008 | Bryant | 370/254 |
| 7,359,377 B1 | 4/2008 | Kompella et al. | 370/389 |
| 7,420,992 B1 | 9/2008 | Fang | 370/477 |
| 7,430,210 B2 | 9/2008 | Havala et al. | 370/395.53 |
| 7,463,639 B1* | 12/2008 | Rekhter | H04L 12/4641 370/409 |
| 7,466,661 B1 | 12/2008 | Previdi et al. | 370/254 |
| 7,471,669 B1 | 12/2008 | Sabesan et al. | 370/351 |
| 7,564,803 B1 | 7/2009 | Minei et al. | 370/254 |
| 7,577,143 B1* | 8/2009 | Kompella | H04L 12/4633 370/392 |
| 7,602,778 B2 | 10/2009 | Guichard et al. | 370/389 |
| 7,610,330 B1 | 10/2009 | Quinn | 709/201 |
| 7,773,630 B2 | 8/2010 | Huang | 370/474 |
| 7,817,667 B2 | 10/2010 | Frederiksen et al. | 370/474 |
| 7,885,259 B2 | 2/2011 | Filsfils | 370/389 |
| 7,885,294 B2 | 2/2011 | Patel | 370/202 |
| 7,894,352 B2 | 2/2011 | Kompella et al. | 370/248 |
| 7,894,458 B2 | 2/2011 | Jiang | 370/401 |
| 7,940,695 B1 | 5/2011 | Bahadur | 370/254 |
| 7,983,174 B1 | 7/2011 | Monaghan | 370/242 |
| 8,064,441 B2 | 11/2011 | Wijnands et al. | 370/389 |
| 8,339,973 B1 | 12/2012 | Pichumani | 370/248 |
| 8,422,514 B1 | 4/2013 | Kothari et al. | 370/466 |
| 8,542,706 B2 | 9/2013 | Wang et al. | 370/474 |
| 8,619,817 B1 | 12/2013 | Everson | 370/474 |
| 8,630,167 B2 | 1/2014 | Ashwood Smith | 370/255 |
| 8,711,883 B2 | 4/2014 | Kang | 370/389 |
| 8,792,384 B2 | 7/2014 | Banerjee et al. | 370/254 |
| 8,953,590 B1* | 2/2015 | Aggarwal | H04L 12/4675 370/389 |
| 9,036,474 B2 | 5/2015 | Dibirdi | 370/235 |
| 9,112,734 B2 | 8/2015 | Edwards et al. | |
| 9,118,572 B2* | 8/2015 | Sajassi | H04L 45/126 |
| 2001/0037401 A1 | 11/2001 | Soumlya | 709/232 |
| 2002/0103732 A1 | 8/2002 | Bundy et al. | 705/35 |
| 2003/0016678 A1 | 1/2003 | Maeno | 370/400 |
| 2003/0026271 A1 | 2/2003 | Erb et al. | 370/401 |
| 2003/0126272 A1* | 7/2003 | Corl, Jr. | H04L 47/10 709/230 |
| 2003/0142674 A1* | 7/2003 | Casey | H04L 12/4633 370/393 |
| 2003/0231634 A1 | 12/2003 | Henderson | 370/395.32 |
| 2004/0160958 A1* | 8/2004 | Oh | H04L 12/5601 370/395.1 |
| 2004/0174879 A1 | 9/2004 | Basso et al. | 370/392 |
| 2004/0196840 A1* | 10/2004 | Amrutur | H04L 41/0896 370/389 |
| 2005/0213513 A1* | 9/2005 | Ngo | H04L 12/4641 370/254 |
| 2005/0259655 A1 | 11/2005 | Cuervo et al. | 370/392 |
| 2006/0002304 A1 | 1/2006 | Ashwood-Smith | 370/238 |
| 2006/0013209 A1 | 1/2006 | Somasundaram | 370/389 |
| 2006/0056397 A1 | 3/2006 | Aizu | 370/352 |
| 2006/0075134 A1 | 4/2006 | Aalto | 709/238 |
| 2006/0080421 A1* | 4/2006 | Hu | H04L 12/24 709/223 |
| 2006/0092940 A1 | 5/2006 | Ansari | 370/392 |
| 2006/0262735 A1 | 11/2006 | Guichard | 370/254 |
| 2006/0274716 A1 | 12/2006 | Oswal et al. | 370/349 |
| 2007/0019647 A1 | 1/2007 | Roy et al. | 370/392 |
| 2007/0053342 A1 | 3/2007 | Sierekl | 370/351 |
| 2007/0058638 A1 | 3/2007 | Guichard et al. | 370/395.31 |
| 2007/0189291 A1 | 8/2007 | Tian | 370/390 |
| 2007/0245034 A1 | 10/2007 | Retana | 709/238 |
| 2008/0002699 A1 | 1/2008 | Rajsic | 370/392 |
| 2008/0075016 A1 | 3/2008 | Ashwood-Smith | 370/252 |
| 2008/0075117 A1 | 3/2008 | Tanaka | 370/471 |
| 2008/0084881 A1 | 4/2008 | Dharwadkar et al. | 370/392 |
| 2008/0101227 A1 | 5/2008 | Fujita et al. | 370/232 |
| 2008/0101239 A1 | 5/2008 | Good | 370/235 |
| 2008/0172497 A1 | 7/2008 | Mohan et al. | 709/249 |
| 2008/0189393 A1 | 8/2008 | Wagner | 709/218 |
| 2008/0192762 A1 | 8/2008 | Kompella et al. | 370/395.53 |
| 2008/0225864 A1 | 9/2008 | Aissaoui et al. | 370/401 |
| 2008/0253367 A1 | 10/2008 | Ould-Brahim | 370/389 |
| 2008/0259820 A1 | 10/2008 | White | 370/255 |
| 2009/0041038 A1* | 2/2009 | Martini | H04L 45/50 370/401 |
| 2009/0067445 A1 | 3/2009 | Diguet | 370/419 |
| 2009/0080431 A1 | 3/2009 | Rekhter | 370/392 |
| 2009/0135815 A1* | 5/2009 | Pacella | H04L 45/50 370/389 |
| 2010/0063983 A1* | 3/2010 | Groarke | H04L 49/9047 707/803 |
| 2010/0088717 A1 | 4/2010 | Candelore et al. | 725/32 |
| 2010/0124231 A1 | 5/2010 | Kompella | 370/40 |
| 2010/0142548 A1 | 6/2010 | Sheth | 370/410 |
| 2010/0220739 A1 | 9/2010 | Ishiguro | 370/401 |
| 2010/0232435 A1 | 9/2010 | Jabr | 370/392 |
| 2010/0284309 A1 | 11/2010 | Allan et al. | 370/256 |
| 2011/0228780 A1 | 9/2011 | Ashwood-Smith | 370/392 |
| 2011/0268114 A1 | 11/2011 | Wijnands et al. | 370/389 |
| 2011/0280123 A1 | 11/2011 | Wijnands et al. | 370/228 |
| 2011/0286452 A1* | 11/2011 | Balus | H04L 12/4641 370/390 |
| 2012/0044944 A1 | 2/2012 | Kotha et al. | 370/401 |
| 2012/0069740 A1 | 3/2012 | Lu et al. | 370/238 |
| 2012/0069845 A1* | 3/2012 | Carney | H04L 63/1466 370/392 |
| 2012/0082034 A1 | 4/2012 | Vasseur | 370/235 |
| 2012/0120808 A1 | 5/2012 | Nandagopal et al. | 370/238 |
| 2012/0213225 A1* | 8/2012 | Subramanian | H04L 45/586 370/392 |
| 2012/0218884 A1* | 8/2012 | Kini | H04L 45/22 370/228 |
| 2012/0307629 A1 | 12/2012 | Vasseur | 370/228 |
| 2013/0003728 A1 | 1/2013 | Kwong et al. | 370/389 |
| 2013/0051237 A1 | 2/2013 | Ong | 370/237 |
| 2013/0077476 A1 | 3/2013 | Enyedi | 370/225 |
| 2013/0077626 A1 | 3/2013 | Keesara et al. | 370/390 |
| 2013/0142052 A1 | 6/2013 | Burbidge | 370/242 |
| 2013/0188634 A1 | 7/2013 | Magee | 370/389 |
| 2013/0219034 A1 | 8/2013 | Wang | 709/222 |
| 2013/0258842 A1 | 10/2013 | Mizutani | 370/228 |
| 2013/0266012 A1* | 10/2013 | Dutta | H04L 45/28 370/392 |
| 2013/0266013 A1* | 10/2013 | Dutta | H04L 45/28 370/392 |
| 2013/0343204 A1 | 12/2013 | Geib et al. | 370/248 |
| 2014/0098675 A1 | 4/2014 | Frost et al. | 370/241.1 |
| 2014/0169370 A1 | 6/2014 | Filsfils et al. | 370/392 |
| 2014/0254596 A1 | 9/2014 | Filsfils et al. | 370/392 |
| 2014/0269266 A1 | 9/2014 | Filsfils et al. | 370/228 |
| 2014/0269421 A1 | 9/2014 | Previdi et al. | 370/254 |
| 2014/0269698 A1 | 9/2014 | Filsfils et al. | 370/389 |
| 2014/0269699 A1 | 9/2014 | Filsfils et al. | 370/389 |
| 2014/0269721 A1 | 9/2014 | Bashandy et al. | 370/392 |
| 2014/0269725 A1 | 9/2014 | Filsfils et al. | 370/392 |
| 2014/0269727 A1 | 9/2014 | Filsfils et al. | 370/392 |
| 2014/0286195 A1* | 9/2014 | Fedyk | H04L 45/02 370/254 |
| 2014/0317259 A1 | 10/2014 | Previdi et al. | 709/223 |
| 2014/0341222 A1 | 11/2014 | Filsfils et al. | 370/395.5 |
| 2014/0369356 A1 | 12/2014 | Bryant et al. | 370/392 |

(56) References Cited

OTHER PUBLICATIONS

Awduche, Daniel O., et al., "RSVP-TE: Extensions to RSVP for LSP Tunnels," Network Working Group, Internet-Draft, Feb. 2001, pp. 1-12.
Awduche, Daniel O., et al., "RSVP-TE: Extensions to RSVP for LSP Tunnels," Network Working Group, Request for Comments 3209, Dec. 2001, pp. 1-61.
Backes, P. and Rudiger Geib, "Deutsche Telekom AG's Statement About IPR Related to Draft-Geig-Spring-OAM-Usecase-01," Aug. 23, 2012, pp. 1-2.
Bryant, S. et al., Cisco Systems, "IP Fast Reroute Using Tunnels-draft-bryant-ipfrr-tunnels-03", Network Working Group, Internet-Draft, Nov. 16, 2007, pp. 1-30.
Bryant, S., et al., Cisco Systems, "Remote LFA FRR," draft-ietf-rtgwg-remote-lfa-04, Network Working Group, Internet-Draft, Nov. 22, 2013, pp. 1-24.
Crabbe, E., et al., "PCEP Extensions for MPLS-TE LSP Protection With Stateful PCE Draft-Crabbe-PCE-Stateful-PCT-Protection-00," Network Working Group, Internet-Draft, Apr. 2013, pp. 1-12.
Crabbe, E., et al., Stateful PCE Extensions for MPLS-TE LSPs, draft-crabbe-pce-statement-pce-mpls-te-00; Network Working Group, Internet-Draft, Apr. 15, 2013, pp. 1-15.
Deering, S., et al., Cisco, Internet Protocol, Version 6 (IPv6) Specification, Network Working Group, Request for Comments 2460, Dec. 1998, pp. 1-39.
Farrel, A., et al., Old Dog Consulting, A Path Computation Element (PCE)—Based Architecture, Network Working Group, Request for Comments 4655, Aug. 2006, pp. 1-80.
Farrel, A., et al., Old Dog Consulting, Inter-Domain MPLS and GMPLS Traffic Enginerring—Resource Reservation Protocol-Traffic Enginerring (RSVP-TE) Extensions, Newtork Working Group, Request for Comments 5151, Feb. 2008.
Fedyk, D., et al., Alcatel-Lucent, Generalized Multiprotocol Label Switching (GMPLS) Control Ethernet Provider Backbone Traffic Engineering (PBB-TE), Internet Engineering Task Force (IETF), Request for Comments 6060, Mar. 2011, pp. 1-20.
Filsfils, C., et al., Cisco Systems, Inc., "Segment Routing Architecture," draft-filsfils-rtgwg-segment-routing-00, pp. 1-28.
Filsfils, C., et al., Cisco Sytems, Inc., "Segment Routing Architecture," draft-filsfils-rtgwg-segment-routing-01, Network Working Group, Internet-Draft, Oct. 21, 2013, pp. 1-28.
Frost, D., et al., Cisco Systems, Inc., "MPLS Generic Associated Channel (G-Ach) Advertisement Protocol," draft-ietf-mpls-gach-adv-00, Internet-Draft, Jan. 27, 2012, pp. 1-17.
Frost, D., et al., Cisco Systems, Inc., "MPLS Generic Associated Channel (G-Ach) Advertisement Protocol," draft-ietf-mpls-gach-adv-08, Internet-Draft, Jun. 7, 2013, pp. 1-17.
Frost, D., et al., Cisco Systems, Inc., "MPLS Generic Associated Channel (G-Ach) Advertisement Protocol," Request for Comments 7212, Jun. 2014, pp. 1-23.
Geib, R., "Segment Routing Based OAM Use Case," IETF 87, Gerlin, Jul./Aug. 2013, pp. 1-3.
Geib, R., Deutsch Telekom, "Use Case for a Scalable and Topology Aware MPLS data plan moniotoring System," draft-geib-spring-oam-usecase-00; Internet-Draft, Oct. 17, 2013, pp. 1-11.
Geib, R., Deutsch Telekom, "Use Case for a Scalable and Topology Aware MPLS data plan moniotoring System," draft-geib-spring-oam-usecase-01; Internet-Draft, Feb. 5, 2014, pp. 1-10.
Gredler, H., et al., Juniper Networks, Inc., "Advertising MPLS Labels in IS-IS draft-gredler-isis-label-advertisement-00," Internet-Draft; Apr. 5, 2013; pp. 1-13.
Gredler, H. et al., hannes@juniper.net, IETF87, Berlin, "Advertising MPLS LSPs in the IGP," draft-gredler-ospf-label-advertisement, May 21, 2013; pp. 1-14.
Guilbaud, Nicolas and Ross Cartlidge, "Google~Localizing Packet Loss in a Large Complex Network," Feb. 5, 2013, pp. 1-43.
Imaizumi, H., et al.; Networks, 2005; "FMEHR: An Alternative Approach to Multi-Path Forwarding on Packed Switched Networks," pp. 198-201.

Kompella, K. et al, Juniper Networks, "Label Switched Paths (LSP) Hierarchy with Generalized Multi-Protocol Label Switching (GMPLS) Traffic Enginerring (TE)," Network Working Group, Request for Comments 4206, Oct. 2005, pp. 1-14.
Kompella, K., et al., Juniper Networks, Inc., "Detecting Multi-Protocol Label Switched (MPLS) Data Plane Failures," Network Working Group, Request for Comments 4379, Feb. 2006, pp. 1-50.
Kompella, K. et al., Juniper Networks,"Virtual Private LAN Service (VPLS) Using BGP for Auto-Discovery and Signaling," Network Working Group, Request for Comments 4761, Jan. 2007, pp. 1-28.
Kumar, N. et al., Cisco Systems, Inc., "Label Switched Path (LSP) Ping/Trace for Segment Routing Networks Using MPLS Dataplane," draft-kumar-mpls-spring-lsp-ping-00, Oct. 21, 2013, pp. 1-12.
Kumar, N. et al, "Label Switched Path (LSP) Ping/Trace for Segment Routing Networks Using MPLS Dataplane," draft-kumarkini-mpls-spring-lsp-ping-00, Network Work Group, Internet-Draft, Jan. 2, 2014, pp. 1-15.
Previdi, S. et al., Cisco Systems, Inc., "Segment Routing with IS-IS Routing Protocol, draft-previdi-filsfils-isis-segment-routing-00," IS-IS for IP Internets, Internet-Draft, Mar. 12, 2013, pp. 1-27.
Previdi, S. et al., Cisco Systems, Inc., "Segment Routing with IS-IS Routing Protocol, draft-previdi-filsfils-isis-segment-routing-02," Internet-Draft, Mar. 20, 2013, A55 pp. 1-27.
Raszuk, R., NTT 13, "MPLS Domain Wide Labels," draft-raszuk-mpls-domain-wide-labels-00, MPLS Working Group, Internet-Draft, Jul. 14, 2013, pp. 1-6.
Rosen, E. et al., Cisco Systems, Inc., "BGP/MPLS VPNs", Network Working Group, Request for Comments: 2547; Mar. 1999, pp. 1-26.
Sivabalan, S., et al.; "PCE-Initiated Traffic Engineering Path Setup in Segment Routed Networks; draft-sivabalan-pce-segmentrouting-00.txt," Internet Engineering Task Force, IETF; Standard Working Draft, Internet Society (ISOC) 4, Rue Des Falaises CH-1205, Geneva, Switzerland, Jun. 2013, pp. 1-16.
Tian, Albert J. et al., Redback Networks, "Source Routed MPLS LSP Using Domain Wide Label, draft-tian-mpls-lsp-source-route-01.txt", Network Working Group, Internet Draft, Jul. 2004, pp. 1-12.
Vasseur, JP, et al.; Cisco Systems, Path Computation Element (PCE) Communication Protocol (PCEP): Request for Comments: 5440, Internet Engineering Task Force, IETF; Standard, Internet Society (ISOC) 4, Rue Des Falaises CH-1205, Geneva, Switzerland, chapters 4-8, Mar. 2009; pp. 1-87.
Wijnands, Ijsbrand and Bob Thomas, Cisco Systems, Inc,; Yuji Kamite and Hitoshi Fukuda, NTT Communications; "Multicast Extensions for LDP;" Network Working Group; Internet Draft; Mar. 2005; pp. 1-12.
Francois, Pierre Jean Rene; "Loop Avoidance During Network Convergence in Switched Networks"; U.S. Appl. No. 14/319,353, filed Jun. 30, 2014; consisting of Specification, Claims and Abstract (29 pages); and Drawings (6 sheets).
Previdi, Stefano B.; "Segment Routing Using a Remote Forwarding Adjacency Identifier"; U.S. Appl. No. 14/334,300, filed Jul. 17, 2014; consisting of Specification, Claims and Abstract (23 pages); and Drawings (8 sheets).
Previdi, Stefano B; "Segment Routing Extension Headers"; U.S. Appl. No. 14/212,084, filed Mar. 14, 2014; consisting of Specification, Claims and Abstract (43 pages); and Drawings (17 sheets).
Cisco Systems, Inc., "Introduction to Intermediate System-to-Intermediate System Protocol," publicshed 1992-2002; pp. 1-25.
Filsfils, C. et al., Cisco Systems, Inc., "Segment Routing Interoperability with LDP", draft-filsfils-spring-segment-routing-ldp-interop-01.txt; Apr. 18, 2014, pp. 1-16.
Eckert, Toerless et al., "Traffic Engineering for Bit Indexed Explicit Replication", U.S. Appl. No. 14/814,575, filed Jul. 31, 2015; consisting of Specification, Claims, and Abstract (75 pages); and Drawing (18 sheets).
Eckert, Toerless et al., "Traffic Engineering for Bit Indexed Explicit Replication", U.S. Appl. No. 14/862,915, filed Sep. 12, 2015; consisting of Specification, Claims, and Abstract (75 pages); and Drawings (18 sheets).

(56) References Cited

OTHER PUBLICATIONS

Eckert, Toerless et al., "Failure Protection for Traffic Engineered Bit Indexed Explicit Replication", U.S. Appl. No. 15/054,480, filed Feb. 26, 2016; consisting of Specification, Claims, Abstract, and Drawings (76 pages).

Eckert, T., "Traffic Engineering for Bit Index Explicit Replication BIER-TE, draft-eckert-bier-te-arch-00," Network Working Group, Internet-Draft, Mar. 5, 2015, pp. 1-21.

Eckert, T., et al., "Traffic Engineering for Bit Index Explicit Replication BIER-TE, draft-eckert-bier-te-arch-01," Network Working Group, Internet-Draft, Jul. 5, 2015, pp. 1-23.

Li, T., et al., Redback Networks, Inc., "IS-IS Extensions for Traffic Engineering," Network Working Group, Request for Comments 5305, Oct. 2008, 17 pages.

Vasseur, JP, et al.; Cisco Systems, Inc. "A Link-Type Sub-TLV to Convey the Number of Traffic Engineering Label Switched Paths Signaled with Zero Reserved Bandwidth Across a Link," Network Working Group, Request for Comments 5330; Oct. 2008, 16 pages.

Alcatel-Lucent, "Segment Routing and Path Computation Element—Using Traffic Engineering to Optimize Path Placement and Efficiency in IP/MPLS Networks"; Technology White Paper; 2015; 28 pages.

Awduche, D. et al., "Requirements for Traffic Engineering Over MPLS"; Network Working Group; Request for Comments: 2702; Sep. 1999; pp. 1-29.

Awduche, D. et al., "Overview and Principles of Internet Traffic Engineering"; Network Working Group; Request for Comments: 3272; May 2002; pp. 1-71.

Filsfils, C. et al., "Segment Routing Architecture"; draft-ietf-spring-segment-routing-07; Network Working Group, Internet-Draft; Dec. 15, 2015; pp. 1-24.

Filsfils, C. et al., "Segment Routing Use Cases", draft-filsfils-rtgwg-segment-routing-use-cases-02; Network Working Group; Internet-Draft; Oct. 21, 2013; pp. 1-36.

Previdi, S. et al., "IS-IS Extensions for Segment Routing"; draft-ietf-isis-segment-routing-extensions-06; IS-IS for IP Internets, Internet-Draft; Dec. 14, 2015; pp. 1-39.

Psenak, P., et al. "OSPF Extensions for Segment Routing", draft-ietf-ospf-segment-routing-extensions-05; Open Shortest Path First IGP; Internet-Draft; Jun. 26, 2015; pp. 1-29.

Psenak, Peter et al., "Enforcing Strict Shortest Path Forwarding Using Strict Segment Identifiers" U.S. Appl. No. 15/165,794, filed May 26, 2016; consisting of Specification, Claims, Abstract, and Drawings (52 pages).

* cited by examiner

| Segment ID | Egress Int ID | Stack Ins |
|---|---|---|
| 9001 | 1 | Inc |
| 9002 | 2 | Inc |
| 9003 | 3 | Inc |
| 64 | 1 | Cont |
| 65 | 1 | Cont |
| 66 | — | Inc |
| 67 | 2 | Cont |
| 68 | 1 | Cont |
| 69 | 3 | Cont |
| 70 | 3 | Cont |
| 71 | 3 | Cont |
| 72 | 2 | Cont |
| 5001 | — | Inc |

| Segment ID | Egress Int ID |
|---|---|
| 9001 | 1 |
| 62 | 1 |
| 66 | 2 |
| 68 | 2 |
| 70 | 2 |
| 72 | 3 |
| ⋮ | ⋮ |
| 74 | 3 |
| 76 | 3 |

*FIG. 5B*

| Segment ID | Egress Int ID |
|---|---|
| 9001 | 1 |
| 62 | 1 |
| 66 | D |
| 68 | D |
| 70 | D |
| 72 | H |
| ⋮ | ⋮ |
| 74 | H |
| 76 | H |

*FIG. 5C*

SEGMENT ROUTING OVER LABEL DISTRIBUTION PROTOCOL

RELATED APPLICATIONS

This application claims the domestic benefit under Title 35 of the United States Code §119(e) of U.S. Provisional Patent Application Ser. No. 61/791,242 entitled "Segment Routing," filed Mar. 15, 2013, which is hereby incorporated by reference in its entirety and for all purposes as if completely and fully set forth herein.

BACKGROUND

Packet forwarding is a process of relaying packets from one communication link to another by nodes in a network. A packet is a formatted unit of data that typically contains control information and payload data. Control information may include: source and destination IP addresses, error detection codes like checksums, sequencing information, etc. Control information is typically found in packet headers and trailers, with payload data in between. Network nodes may take form in one or more routers, one or more bridges, one or more switches, or any other suitable communications processing device.

At network nodes where multiple outgoing links are available, the choice of link to use for packet forwarding requires a decision process that, while simple in concept, can be complex. Since packet forwarding decisions are handled by nodes, the total time required for this can become a major limiting factor in overall network performance.

Label Distribution Protocol (LDP) is a mechanism where network nodes (e.g., routers) capable of Multiprotocol Label Switching (MPLS) exchange labels with their neighbors. These labels can be subsequently attached to packets and used by nodes to make packet forwarding decisions. For purposes of explanation only, nodes that make packet forwarding decisions based on labels will be referred to as LDP nodes. Packet forwarding based on labels stands in stark contrast to traditional Internet Protocol (IP) routing in which packet forwarding decisions are made using IP addresses contained within packets. Because LDP nodes use labels, there is no need for LDP nodes to examine the contents (e.g., IP addresses) of packets to make packet forwarding decisions.

BRIEF DESCRIPTION OF THE DRAWINGS

The present disclosure may be better understood, and its numerous objects, features, and advantages made apparent to those skilled in the art by referencing the accompanying drawings.

FIG. 2B is graphical representation of an example forwarding table stored in a node.

FIGS. 5B and 5C are graphical representations of an example forwarding table stored in a node.

DETAILED DESCRIPTION

Overview

Figure 1:
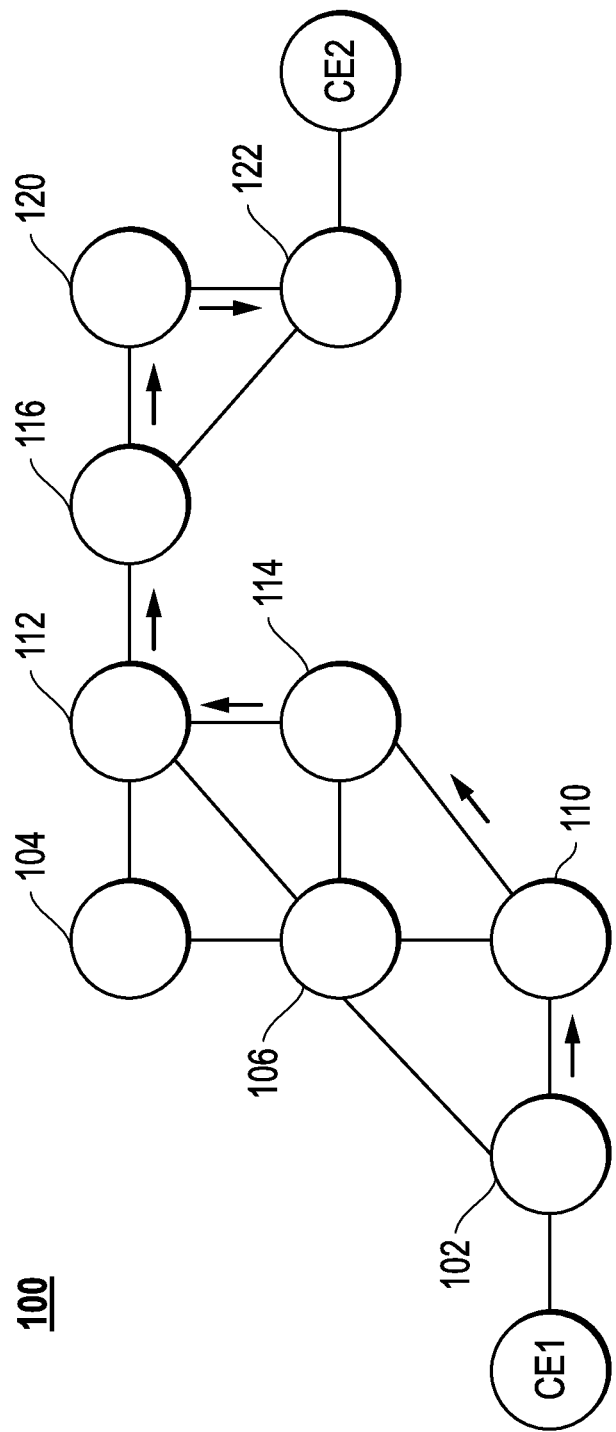
FIG. 1 is a block diagram illustrating an example network.

An apparatus and method is disclosed for segment routing (SR) over label distribution protocol (LDP). In one embodiment, the method includes a node receiving a packet with an attached segment ID. In response, the node may attach a label to the packet. Thereafter, the node may forward the packet with the attached label and segment ID to another node via a label switched path (LSP).

Packet Forwarding

IP routing and Multiprotocol Label Switching (MPLS) are distinct packet forwarding mechanisms. IP routing uses IP addresses inside packet headers to make forwarding decisions. In contrast, LDP nodes (i.e., nodes employing MPLS) can make forwarding decisions using short path identifiers called labels that are attached to packets. Segment routing (SR) is yet another mechanism that can be employed. SR is similar to MPLS in many regards. For example, forwarding decisions in SR can be based on short path identifiers called segment IDs that are attached to packets. However, substantial differences exist between SR and MPLS as will be more fully described below.

IP Routing

IP routing uses routing tables that maintain forwarding information to various destinations. In one embodiment, when a packet arrives at a node, the node can use the destination IP address in the packet header to access a routing table and lookup corresponding forwarding information such as an egress interface, which is the interface or port to be used to forward the packet to the next node on a path to the packet's final destination. After the packet is forwarded the next node performs its own routing table lookup using the same destination IP address, and so on.

MPLS and LDP

MPLS is commonly employed in provider networks or networks that provide packet transport and other services for customers. Packets enter an MPLS provider network via an ingress provider edge (PE) node, travel hop-by-hop along a label-switched path (LSP) that includes one or more core nodes, and exit the provider network via an egress PE node.

Packets are forwarded along an LSP based on LDP forwarding tables and labels attached to packets. Labels allow for the use of very fast and simple forwarding engines in the dataplane of LDP nodes. Another benefit of MPLS is the elimination of dependence on a particular Open Systems Interconnection (OSI) model data link layer technology to forward packets.

A label is a short, fixed-length, locally significant identifier that can be associated with a forwarding equivalence class (FEC). Packets associated with the same FEC should follow the same LSP through the provider network. LSPs can be established for a variety of purposes, such as to guarantee a certain level of performance when transmitting packets, to forward packets around network congestion, to create IP tunnels for network-based virtual private networks, etc. In many ways, LSPs are no different than circuit-switched paths in ATM or Frame Relay networks, except that they are not dependent on a particular Layer 2 technology.

LDP is employed in the control plane of LDP nodes. Two nodes, called LDP peers, exchange label mapping information on a FEC by FEC basis. The exchange of information can be bi-directional. LDP generates labels for, and exchanges labels between, peer nodes. LDP can be used to build and maintain LDP forwarding tables that map labels and node interfaces. These forwarding tables can be subsequently used by nodes to forward packets through MPLS networks as more fully described below.

When a packet is received by an ingress PE node of an MPLS network, the ingress PE node may determine a corresponding FEC. Characteristics for determining the FEC for a packet can vary, but typically the determination is based on the packet's destination IP address. Quality of Service for the packet may also be used to determine the FEC. Once determined, the ingress PE node can access a table to select a label that is mapped to the FEC. The table may also map an egress interface to the FEC. Before the ingress PE node forwards the packet via the egress interface, the ingress PE node pushes or attaches the label to the packet.

A packet with attached label can be forwarded along an LSP, and nodes in the LSP can make forwarding decisions based on labels. To illustrate, when an LDP node receives a packet with an attached label (i.e., incoming label), an LDP forwarding table in the node can be accessed to read an egress interface and a label (i.e., an outgoing label) mapped to the incoming label. Before the packet is forwarded via the egress interface, the node may swap the incoming label with the outgoing label. The next hop receives the packet and attached label and may perform the same process. This process is often called hop-by-hop forwarding along a non-explicit path. The egress PE node in the LSP may pop or remove an incoming label before the packet is forwarded to a customer. To illustrate, FIG. 1 shows a portion of an example MPLS provider network 100 that includes LDP nodes 102-122 coupled together via communication links. An LSP from node 102 to node 122 can be created so that all packets of a stream associated with a particular FEC sent from node 102 to node 122 can travel forward through the same set of LDP nodes. Each node maintains information for the LSP established through it in an LDP forwarding table. If node 110 knows that node 114 is the next hop along the LSP for all packets received from node 102 that are destined for node 122, node 110 can forward the packets to node 114.

Segment Routing

Segment routing (SR) is a mechanism in which packets can be forwarded using SR forwarding tables and segment IDs attached to packets. Like MPLS, SR enables very fast and simple forwarding engines in the dataplane of nodes. SR is not dependent on a particular Open Systems Interconnection (OSI) model data link layer technology to forward packets.

SR nodes (i.e., nodes employing SR) are similar to LDP nodes in many ways. Since most SR nodes make forwarding decisions based on segment IDs as opposed to labels, however, SR nodes need not employ LDP in their control planes. Unless otherwise indicated, an SR node lacks LDP in the control plane. Additional differences can exist between SR nodes and LDP nodes.

SR can be employed in provider networks. Packets enter an SR enabled provider network via an ingress provider edge (PE) node, travel hop-by-hop along a segment-switched path (SSP) that includes one or more core nodes, and exit the provider network via an egress PE node. The remaining disclosure will make reference to an autonomous, provider network that operates under one administrative domain. In general a provider network may contain a contiguous set of nodes.

Like labels, segment IDs are short (relative to an IP address or a FEC), fixed-length identifiers. Segment IDs may correspond to topological segments of a provider network or services provided by nodes thereof. Topological segments can be one hop paths to SR nodes, or they can be multi hop paths to SR nodes. Topological segments act as sub-paths that can be combined to form an SSP. Stacks of segment IDs can represent SSPs as will be described below. Like LSPs, SSPs can be associated with FECs. Thus segment ID stacks may correspond to FECs.

There are several types of segment IDs including but not limited to: nodal-segment IDs, adjacency-segment IDs, and service-segment IDs. A nodal-segment ID represents a one-hop or a multi-hop, shortest path (SPT) within the provider network to an associated SR node. Nodal-segment IDs are assigned to respective SR nodes within the provider network so that no two SR nodes in the provider network are assigned the same nodal-segment ID. In one embodiment, all assigned nodal-segment IDs are selected from a predefined ID range (e.g., [64, 5000]) for the provider network. The range for nodal-segment IDs may be different from a predefined range for labels.

Nodal-segment IDs can be mapped in memory to unique identifiers. For purposes of explanation only, nodal-segment IDs are mapped to respective node loopback prefix IP addresses. One of ordinary skill understands that node loopback prefix IP addresses (node prefixes for short) distinguish the SR nodes from each other within the provider network. The node prefixes can be used by link state protocols such as open shortest path first (OSPF) or intermediate system to intermediate system (IS-IS), or modifications thereof, operating in the control plan of an SR node to identify egress interfaces for shortest paths (SPTs) to respective SR nodes. Once identified, the SPT egress interfaces can be mapped to nodal-segment IDs within an SR forwarding table as the SR forwarding table is created or subsequently updated.

An adjacency-segment ID represents a link between adjacent SR nodes. For purposes of explanation only, this disclosure will refer to a link between nodes as an adjacency segment (hereafter adjacency). Adjacencies can be uniquely identified in the provider network. For purposes of explanation only, this disclosure will identify an adjacency (hereafter adjacency-ID) using the node prefixes of nodes between which the adjacency is immediately positioned. To illustrate, for an adjacency between two nodes identified by node prefix X and node prefix Y, the adjacency will be identified herein as adjacency-ID XY. This disclosure will presume that only one adjacency exists between nodes in the provider network, it being understood the present disclosure should not be limited thereto. As such, adjacencies are unique in the provider network of this disclosure. Since adjacencies are unique, it follows that adjacency-IDs are likewise unique. Adjacency-IDs should not be confused with adjacency-segment IDs; adjacency-segment IDs may not be unique within the provider network domain.

Each SR node can assign a distinct adjacency-segment ID for each of the SR node's adjacencies. Separate SR nodes may assign the same adjacency-segment ID. Adjacency-segment IDs, however, are locally significant; separate SR nodes may assign the same adjacency-segment ID, but that adjacency-segment ID represents distinct adjacencies. In one embodiment, adjacency-segment IDs are selected from a predefined range that is outside the predefined range for nodal-segment IDs. The predefined range of adjacency-segment IDs may also be outside the predefined range for labels.

Service-segment IDs correspond to packet services performed by SR nodes such as deep packet inspection (DPI) and/or filtering. Each SR node can assign a distinct service-segment ID for each of the SR node's packet services. For the purposes of explanation only, a node will offer no more than one service. Service-segment IDs are locally significant. Like adjacency-IDs, separate SR nodes may assign the same service-segment ID for their respective services. Service-segment IDs can be selected from the same range as the adjacency-segment IDs, or service-segment IDs can selected from a predefined range that is distinct from the ranges for labels, adjacency-segment IDs and/or nodal-segment IDs. The service-segment IDs can be assigned based on service type, it being understood the present disclosure should not be limited thereto. As an example, adjacency-segment ID 5001 is always mapped to deep packet inspection within the provider network, regardless of the node or nodes that perform the service.

SR nodes can advertise their nodal-segment IDs, adjacency-segment IDs, service-segment IDs, and node prefixes to other SR nodes in the provider network using a protocol such as interior gateway protocol (IGP) or a modification thereof. SR nodes can use the nodal-segment IDs, adjacency-segment IDs, service-segment IDs, node prefixes, and/or other information to create or update SR forwarding tables and/or segment ID stacks.

In one embodiment the SR nodes can advertise their nodal-segment ID/node prefix pairs, adjacency-segment ID/adjacency-ID pairs, and/or service-segment ID/node prefix pairs. The control planes of an SR node can receive and use the nodal-segment ID/node prefix pairs and a link-state protocol such as IS-IS or OSPF, or modified versions thereof, to identify egress interfaces for SPTs to SR nodes. An SPT egress interface, once identified, can be mapped to its respective nodal-segment ID in the node's SR forwarding table. Nodes also map their adjacency-segment IDs to egress interfaces for respective adjacencies in SR forwarding tables. Because adjacency-segment IDs are locally significant, however, adjacency-segment IDs should only be mapped in SR forwarding tables of the nodes that advertise the adjacency-segment IDs. In other words, an SR node that advertises an adjacency-segment ID/adjacency-ID pair should be the only node in the provider network that has a SR forwarding table that maps the adjacency-segment ID to an egress interface connected to an adjacency identified by the adjacency-ID. Service-segment IDs are also locally significant and should only be mapped in the nodes in which they are advertised. Unlike adjacency-segment IDs, however, service-segment IDs are not mapped to egress interfaces. Rather, the service-segment IDs are mapped to respective services that can be implemented by the node.

Segment Routing (SR) enables segment-switched paths (SSPs), which can be used for transporting packets through the provider network. Like LSPs, SSPs are typically associated with FECs, and can be established for a variety of purposes, such as to guarantee a certain level of performance. Packets associated with the same FEC will typically follow the same SSP of SR nodes through the provider network. Nodes in SSPs make forwarding decisions based on segment IDs, not based on the contents (e.g., destination IP addresses) of packets. As such, packet forwarding in SSPs is not dependent on a particular Layer 2 technology.

SR nodes can use nodal-segment IDs, adjacency-segment IDs, and service-segment IDs they receive in advertisements from other SR nodes in order to create ordered lists of segment IDs (i.e., segment ID stacks). Segment ID stacks correspond to SSPs, respectively, that forward packets between nodes (e.g., SR enabled ingress and egress nodes) in the provider network. Segment IDs in a stack may correspond to respective segments or sub paths of a corresponding SSP. When an SR source node (e.g., an SR ingress PE node) receives a packet, the node can calculate a FEC for the packet in much the same way that LDP ingress PE nodes calculate FECs for packets received from a customer edge router. The SR source node uses the FEC it calculates to select a segment ID stack mapped thereto. The SR source node can add the selected segment ID stack to a header, and then attach the header to the packet. The packet with attached stack can traverse the segments of the SSP in an order that corresponds to the list order of the segment IDs in the stack. A forwarding engine operating in the dataplane of each SR node can use a segment ID within the stack and an SR forwarding table in order to forward the packet and header to the next node in the SSP. As the packet and attached header are forwarded along the SSP in a hop-by-hop fashion, the attached stack of segment IDs remains unchanged in one embodiment.

Figure 2A:
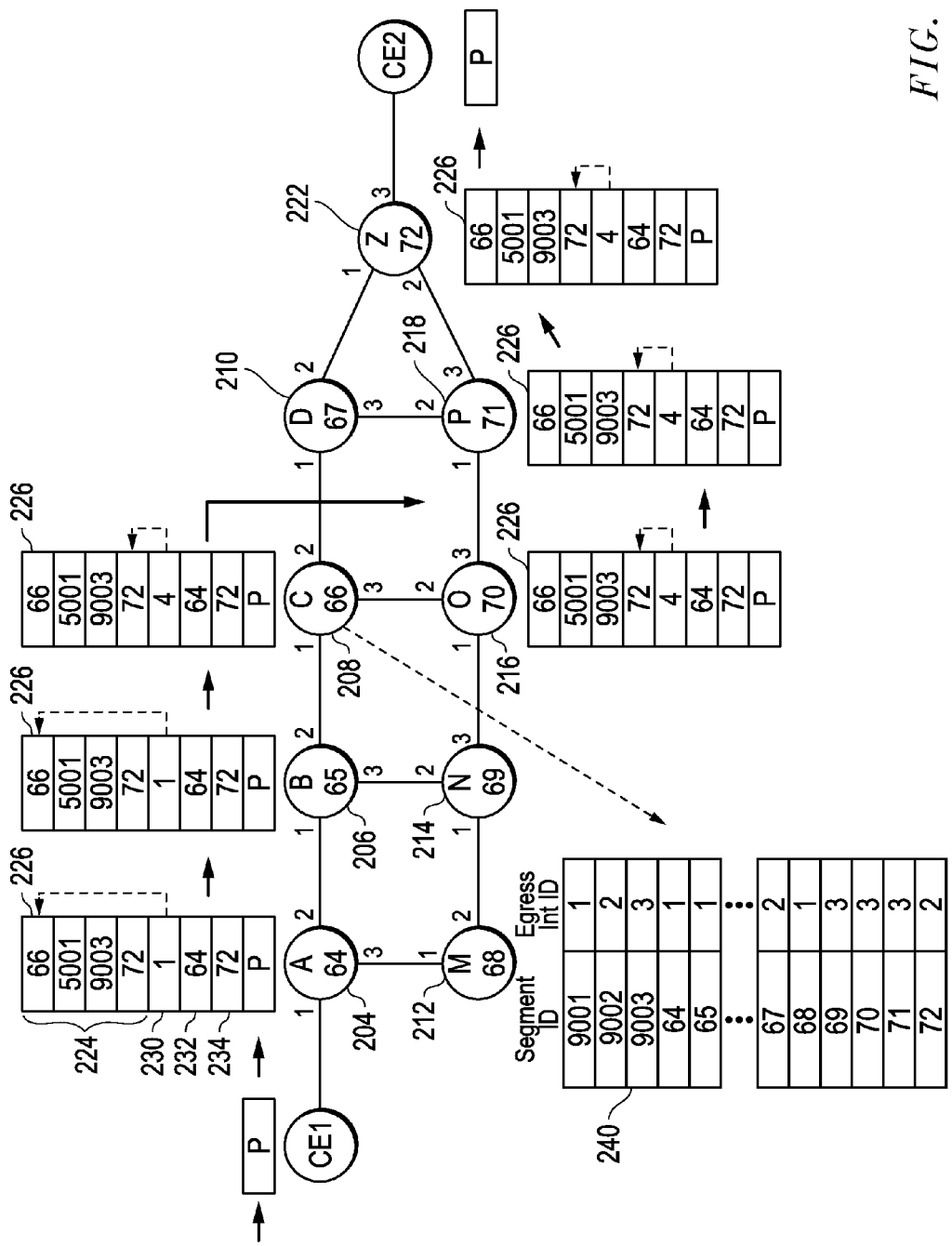
FIG. 2A is a block diagram illustrating an example network.

To illustrate general concepts of SR, FIG. 2A shows: a portion of an example SR enabled provider network 202 that is in data communication with customer edge routers CE1 and CE2; an example header 226 containing an example segment ID stack 224, and; an example SR forwarding table 240.

Provider network 202 consists of SR nodes 204-222. Nodes 204-210 are assigned unique nodal-segment IDs 64-67, respectively, SR enabled routers 212-218 are assigned unique nodal-segment ID's 68-71, respectively, and SR enabled router 222 is assigned unique nodal-segment ID of 72. Each of the SR nodes 204-222 have interfaces that are identified as shown. For example, node 204 has three interfaces designated 1-3, respectively. Each of the nodes 204-222 is assigned a node prefix that is unique within network 202. Node prefixes A-D are provided for nodes 204-210, respectively, node prefixes M-P are provided for nodes 212-218 respectively, and node prefix Z is provided for node 222. As noted above, these node prefixes are unique within network 202 and can be used for several purposes such as calculating the topology of network 202, which in turn can be used to calculate SPTs. Nodes 204-222 can also assign locally significant adjacency-segment IDs and/or service-segment IDs. For example, node 208 can assign adjacency-segment IDs 9001-9003 for adjacencies CB, CD, and CO, respectively, and node 208 can assign service-segment ID 5001 for a deep packet inspection service provided by the node.

Each of SR nodes 204-222 can advertise its service-segment ID, adjacency-segment ID(s), nodal-segment ID, and node prefix to the other nodes in network 202. For example, node 208 can generate and send one or more advertisements that: map adjacency-segment IDs 9001-9003 to adjacency IDs CB, CD, and CO, respectively; map nodal-segment ID 66 to node prefix C, and; map service-segment ID 5001 to a deep packet inspection service. Using the advertisements they receive, the control planes of nodes 204-222 can generate respective SR forwarding tables for use in the dataplanes. For example, node 208 can generate example SR forwarding table 240 using a link state protocol and the advertisements that node 208 receives directly or indirectly from nodes 204, 206, 210, 212-218, and 222. Example SR forwarding table 240 maps adjacency-segment IDs 9001-9003 to node interface IDs 1-3, respectively, and nodal-segment IDs such as 64, 65, 67, 70, and 72, to node 208 interface identifiers 1, 1, 2, 3, and 2, respectively, which are the SPT egress interface identifiers determined by node 208 for node prefixes A, B, D, O, and Z respectively. It is noted that in the embodiment shown, only SR forwarding table 240 maps adjacency-segment IDs 9001-9003 to interface identifiers; SR forwarding tables in the other nodes of network 202 should not map adjacency-segment IDs 9001-9003.

In addition to creating SR forwarding tables based on received segment ID advertisements, several SR nodes 204-222 can calculate segment ID stacks for respective SSPs. For example, node 204 calculates example segment ID stack 224 for an SSP between ingress node 204 and egress node 222. Example segment stack 224 can be calculated for a particular FEC (e.g., FEC F).

Example stack 224 includes four segment IDs: nodal-segment IDs 66 and 72 advertised by nodes 208 and 222, respectively; service-segment ID 5001 advertised by node 208, and; adjacency-segment ID 9003 advertised by node 208. Stack 224 corresponds to an SSP in which packets flow in order through nodes 204, 206, 208, 216, 218, and 222. Packets flowing through this SSP are also subjected to the deep packet inspection service provided by node 208.

SR node 204 is an ingress PE node for packets received from customer edge router CE1. In response to receiving a packet, ingress SR node 204 can calculate a FEC based upon, for example, one or more IP addresses contained within the packet. After calculating the FEC for the packet, node 204 can select a segment ID stack, which is mapped to the calculated FEC from a table stored in memory (not shown). For example, node 204 can calculate FEC F for packet P based on the destination IP address in packet P. As noted above, FEC F is mapped to example stack 224. Node 204 may then create a header such as header 226 for packet P that contains the selected segment ID stack 224. Example header 226, as shown in FIG. 2A, also includes an active segment ID pointer 230. The active segment ID pointer points to or identifies a segment ID (hereafter the active segment ID) in the stack that an SR node should consider when the node receives the packet and attached header. When the header is first created the active segment ID pointer 230 should be set to 1, thereby pointing to the first segment ID of the stack. In some embodiments, a header may include identifications (e.g., respective nodal-segment IDs or node prefixes) of the source and destination (e.g., ingress and egress nodes) for the associated SSP. In FIG. 2A, nodal-segment IDs are used for source identification 232 and destination identification 234 in example header 226. Additional information such as TTL may be included in headers.

Example segment stack 224 lists segment IDs that correspond to one hop and multi hop segments of provider network 202 that packets with stack 224 traverse to reach egress node 222. The segments collectively form the SSP corresponding to stack 224. Once header 226 is attached to packet P, ingress SR enable node 204 may access a SR forwarding table (not shown) using the active segment ID of the segment ID stack 224. Again, the active segment ID is identified by the active segment ID pointer 230. In the embodiment shown in FIG. 2A, active segment ID pointer is set to 1 at ingress SR node 204. Accordingly, the active segment ID within header 226 is nodal-segment ID 66. SR node 204 accesses its SR forwarding table using nodal-segment ID 66 to read egress interface identifier 2 mapped, which is the egress interface for the SPT to the SR node that is assigned nodal-segment ID 66.

Figure 3A:
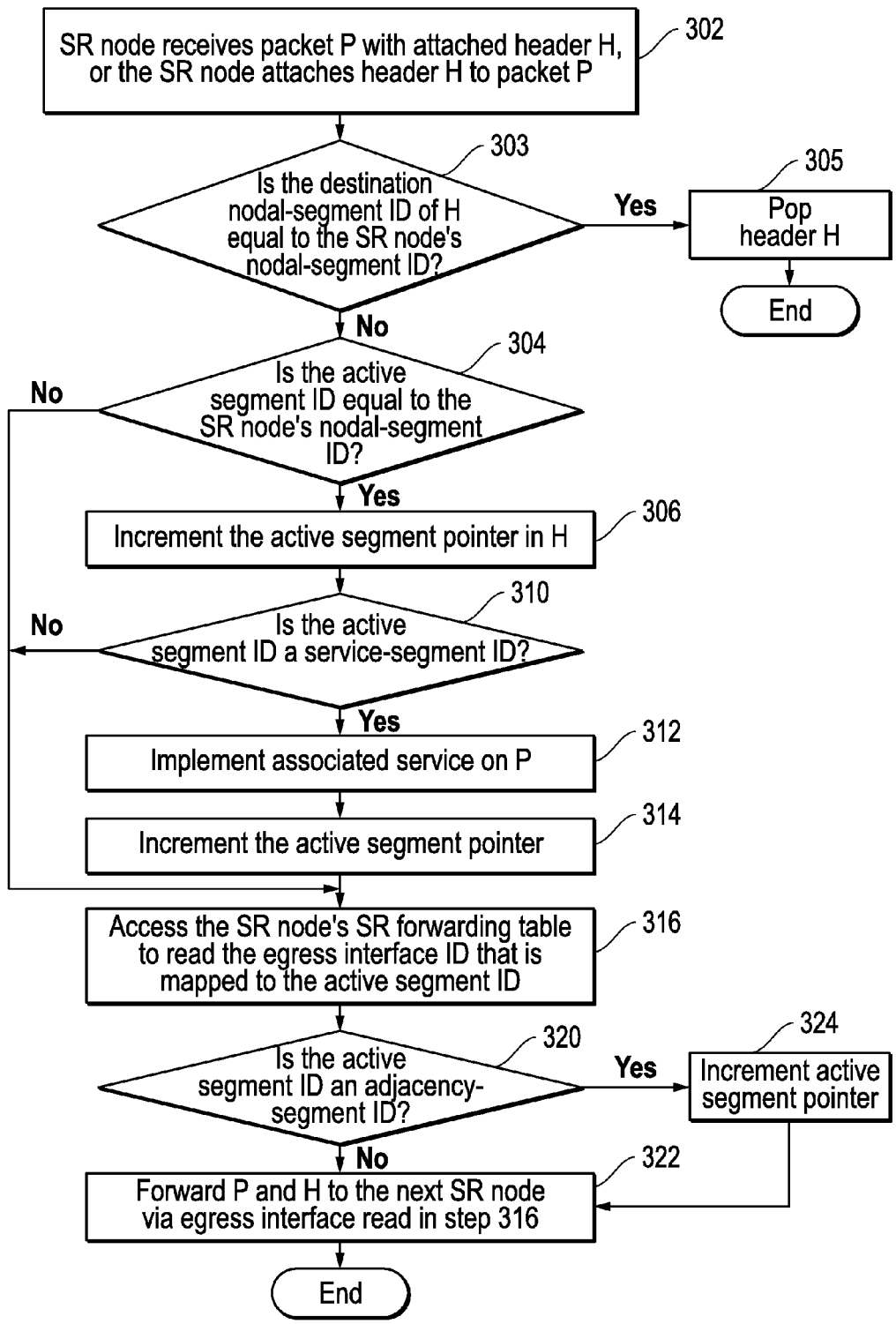
FIG. 3A is a flow chart illustrating an example process employed by a node of FIG. 2A.

With continuing reference to FIG. 2A, FIG. 3A illustrates example aspects of packet forwarding using SR according to one embodiment. More particularly, FIG. 3A illustrates an example method performed by an SR node in a provider network like that shown in FIG. 2A in response to receiving a packet with an attached header H, or in response to attaching a header H to a packet. The first step in the method is a determination of whether the SR node is the destination node of the SSP. There are many ways this can be implemented. For example, if the active segment ID pointer cannot be incremented because the active segment ID is the last segment ID in the stack, the SR node is the destination. In the embodiment shown if the destination nodal-segment ID in header H equals the SR node's nodal-segment ID, the SR node is the destination, and the SR node detaches header H before forwarding the packet using, for example, IP routing. Otherwise, the SR node proceeds to determine the active segment ID in the segment ID stack. More particularly, the SR node reads the active segment ID pointer to identify the active segment ID of the segment ID stack. The SR node then determines whether the active segment ID is equal to the nodal-segment ID assigned to the SR node. Step 304 can be performed by the SR node by comparing the active segment ID with the nodal-segment ID assigned to the SR node. If the SR node determines that the active segment ID is the node's nodal-segment ID, the process proceeds to step 306 where the SR node increments the active segment ID pointer, which in turn identifies the next or new active segment ID. After the SR node increments the active segment pointer in step 306, the SR node determines whether the active segment ID is a service-segment ID for a service to be performed by the SR node. This step can be implemented simply by comparing the active segment ID with a service-segment ID mapped to a service in memory of the SR node, or by comparing the active segment ID with a range of IDs that are reserved for service-segment IDs. If the SR node determines in step 310 that the active segment ID is a service-segment ID, then the process proceeds to step 312 where the SR node implements the offered service on packet P. Thereafter, in step 314 the SR node increments the active segment ID pointer, which in turn identifies the next or the new active segment ID in the segment ID stack.

Presuming the active segment ID does not equal the SR node's nodal-segment ID in step 304, or the active segment ID is not a service-segment ID as determined in step 310, the process proceeds to step 316 where the SR node accesses its SR forwarding table to read the egress interface ID that is mapped to the active segment ID. In step 320 the SR node determines whether the active segment ID is an adjacency-segment ID or a nodal-segment ID. This determination may be implemented by simply comparing the active segment ID with the designated range of nodal-segment IDs that are available for assignment within the network. Thus, if the active segment ID is found to be a number within the designated range, the active segment ID is a nodal-segment ID and the SR node forwards packet P and attached header H to the next node via the egress interface that is identified in step 316. Otherwise, the active segment ID is an adjacency-segment ID, and the active segment pointer 324 is incremented before packet P and header H are forwarded to the next node via the egress interface that is identified in step 316.

It is noted that in an alternative embodiment, an active segment ID pointer is not needed. In this alternative embodiment, the segment ID at the top of the stack is considered the active segment ID, and segment IDs can be popped from the segment ID stack at steps 306, 314 or 324 instead of incrementing a pointer in the header as shown. In this alternative embodiment, however, the stack changes substantially as the packet and header traverse the SSP.

With continuing reference to FIG. 3A, FIG. 2A shows packet P and the state of active segment pointer 230 as packet P and header H are forwarded by nodes of the SSP corresponding to segment stack 224. As shown, pointer 230 does not change as nodes 204 and 206 forward packet P and header 226. However, the active segment pointer 230 is incremented twice at node 208 in accordance with steps 306 and 314 respectively. Nodes 216 and 218 forward packet P and header 226 without incrementing active segment pointer 230. SR egress PE node 222 recognizes the destination nodal-segment ID as its own nodal-segment ID, and as a result node 222 detaches header 226 from packet P in accordance with step 305. Eventually, node 222 may employ traditional IP routing and forward packet P to CE2 based on routing table lookup using the destination IP address within packet P.

FIG. 3A illustrates an example method employed by SR nodes when forwarding a packet P with attached header H using, for example, the SR forwarding table 240 shown within FIG. 2A. Other SR forwarding methods are contemplated. For example, one alternative method for forwarding packets in SR nodes employs a slightly different SR forwarding table. In this alternative embodiment, a stack instruction can be added to the SR node forwarding table. This stack instruction, when implemented can change the active segment pointer within header H without having to go through a comparatively complex method like that shown within FIG. 3A. FIG. 2B illustrates an example SR forwarding table that includes stack instructions mapped to segment IDs. In one embodiment, the stack instructions are limited to increment (Inc.), which instructs the SR node to increment the active segment pointer, and continue (Cont.), which instructs the SR node to leave the active segment pointer ID as is. Other stack instructions are contemplated. In contrast to the SR forwarding table 240 shown in FIG. 2A, the SR forwarding table 241 shown in FIG. 2B may include service-segment IDs, and the nodal-segment ID for the SR node that contains the table. To illustrate, the SR forwarding table 241 shown in FIG. 2B illustrates an example of the alternative that can be employed in node 208 shown within FIG. 2A. As can be seen in FIG. 2B, example table 241 includes nodal-segment ID 66, which is assigned to SR node 208, and service-segment ID 5001, which corresponds to the deep packet inspection service provided by node 208. These segment IDs, however, are not mapped to egress interface identifiers in SR forwarding table 241. Rather, nodal-segment ID 66 and service-segment ID 5001 are mapped to null.

Figure 3B:
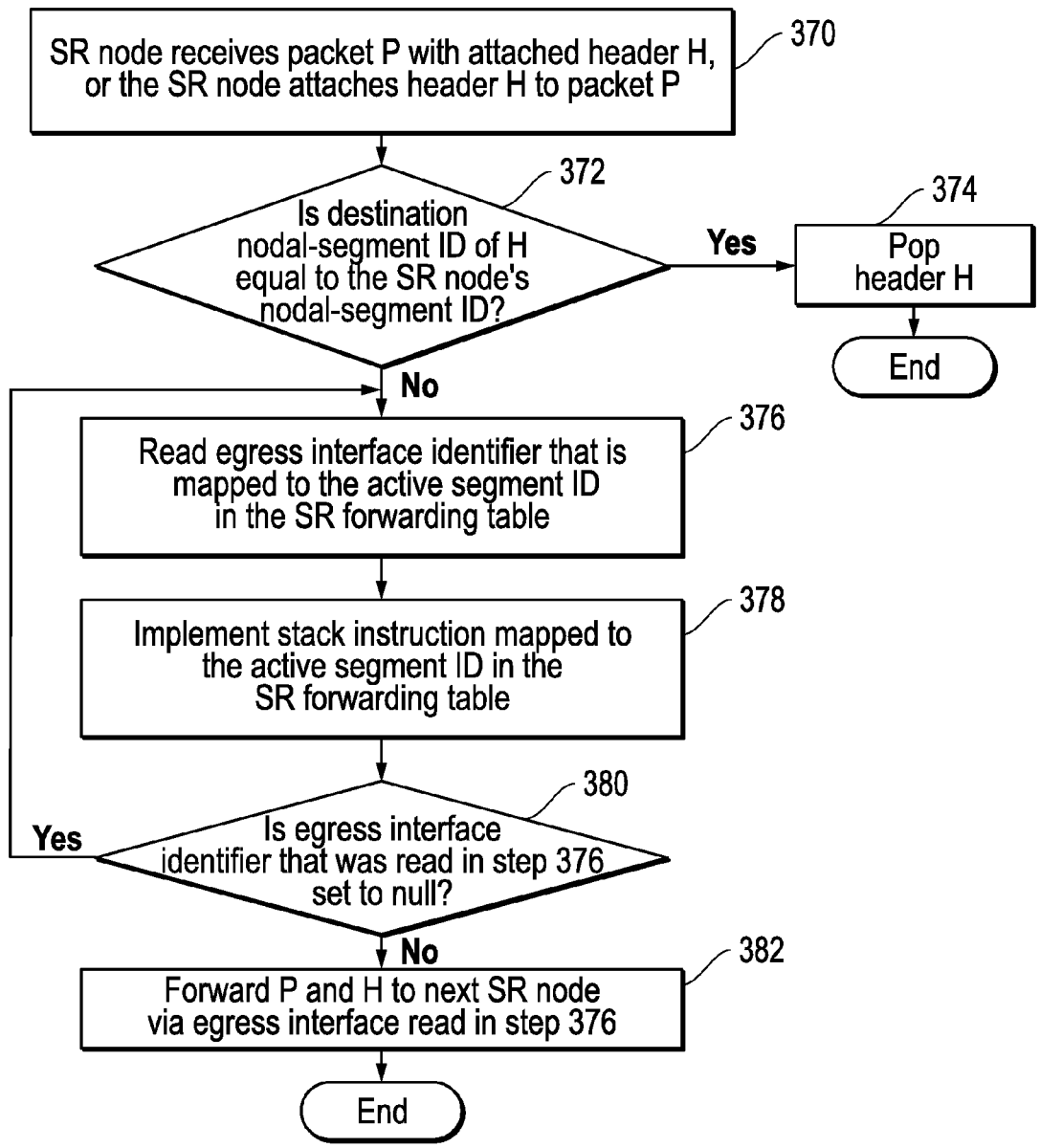
FIG. 3B is a flow chart illustrating an example process employed by a node of FIG. 2A.

With continuing reference to FIGS. 2A, 2B, FIG. 3B illustrates an alternative method that can be employed by an SR node in FIG. 2A using the alternative SR forwarding table such as that shown within FIG. 2B. The process in FIG. 3B starts when an SR node receives a packet P with attached header H such as header 226 shown within FIG. 2A, or when the SR node attaches header H to packet P. The SR node determines whether the destination-nodal segment ID 234 within H is equal to the SR node's nodal-segment ID. If these two nodal segment IDs are equal in step 372, the packet has reached the last SR node in the SSP, and as a result the SR node pops header H before forwarding packet P to, for example, customer edge router such as CE2. However, if the destination nodal-segment ID does not equal the SR node's nodal-segment ID, the process proceeds to step 376 where the SR node reads the egress interface identifier mapped to the active segment ID within the SR forwarding table. Then the SR node implements the stack instruction that is mapped to the active segment ID. Again, in this embodiment, the stack instruction, which is implemented by the forwarding engine in one embodiment, increments the active segment pointer if the mapped instruction is set to increment, or does not increment the active segment pointer if the mapped instruction is set to continue. In step 380, the SR node determines whether the egress interface identifier that was read in step 376 is set to null. Again, an egress interface identifier is set to null when it is mapped to the SR node's nodal-segment ID or when the egress interface identifier is mapped to the SR node's service-segment ID. It is noted that, although not shown within FIG. 3B, the SR node will implement the service associated with the service-segment ID prior to implementing the stack instruction mapped to the service-segment ID within the SR forwarding table. At any rate, if the egress interface identifier read in step 376 is set to null, the SR node repeats step 376. Otherwise, the SR node forwards packet P and attached header H to the next SR node via the egress interface that was read in step 376 as shown in step 382.

SR Over LDP

Figure 4:
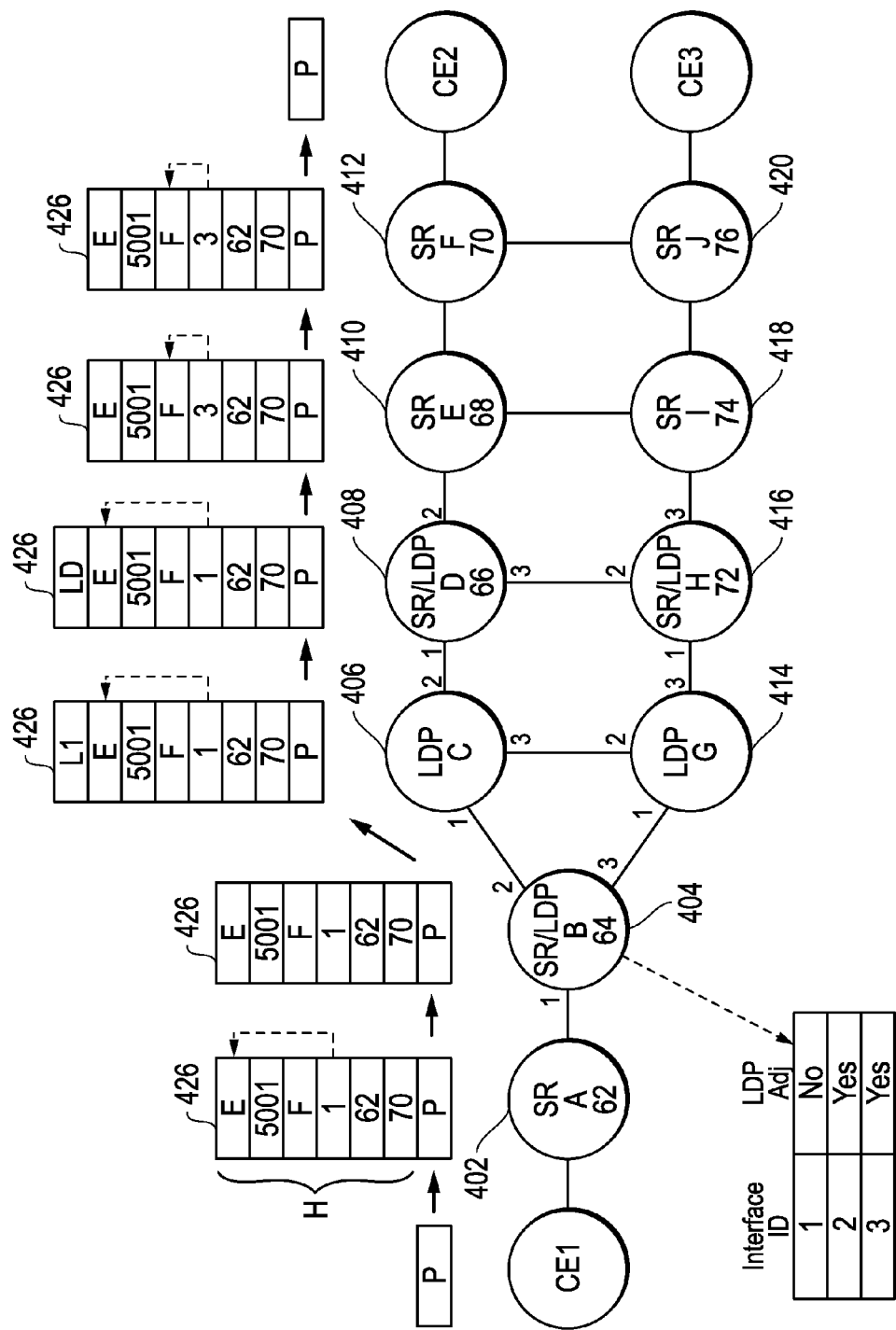
FIG. 4 is a block diagram illustrating an example network.

FIGS. 1 and 2A illustrate example provider networks that contain LDP nodes and SR nodes, respectively. Some providers may seek to present hybrid networks or networks that contain both LDP and SR nodes. However, the differences in the packet forwarding mechanisms described above with respect to SR nodes and LDP may preclude interoperability between SR and LDP nodes when directly coupled to each other. Hybrid provider networks, however, can be configured to enable packet transport or other services for customers. For example, SR/LDP nodes, or nodes that have SR and LDP characteristics, can be positioned between SR nodes and LDP nodes to enable packet forwarding therebetween. FIG. 4 illustrates a portion of an example provider network 400 that employs SR/LDP nodes. Network 400 can provide packet transport and other services to customers via an SSP that flows over an LSP that includes one or more core LDP and SR/LDP nodes as will be more fully described.

Provider network 400 includes nodes 402-420 coupled between customer edge routers CE1-CE3. PE Nodes 402, 412, and 420 are SR enabled, core nodes 406 and 414 are LDP enabled, core nodes 410 and 418 are SR enabled, and core nodes 404, 408, and 416 are SR/LDP enabled. In FIG. 4 the PE SR nodes, the core SR nodes, and the core LDP nodes operate in substantially the same manner as the PE SR nodes, the core SR nodes, and the core LDP nodes described above. Each of the core SR/LDP nodes of FIG. 4 implements a slightly different version of SR, LDP and MPLS described above.

All nodes in a hybrid provider network are assigned respective node prefixes that are unique within the provider network. Nodes 402-420 are assigned node prefixes A-J, respectively. Each of the nodes can advertise its node prefix using an IGP protocol or a modification thereof. Each of these advertisements may include a node type identifier that indicates the node's type as LDP enabled, SR enabled, or SR/LDP enabled. The node prefix advertisements allow each of the nodes 401-420 to create a topology map of provider network 400. In one embodiment, the topology map may include information that identifies those nodes that are LDP enabled, SR enabled, and SR/LDP enabled using the node type identifiers mentioned above. Using a link state protocol like IS-IS or OSPF, each of the nodes 402-420 can create a routing table that maps SPT egress interfaces to node prefixes for the nodes.

All SR and SR/LDP nodes in network 400 are assigned a unique nodal-segment ID. Moreover, adjacencies and services are assigned adjacency-segment IDs and service-segment IDs, respectively, in accordance with the SR principles set forth above. For purposes of explanation only, SR/LDP nodes in network 400 do not advertise adjacency-segment IDs for adjacencies directly coupling LDP nodes.

The SR and SR/LDP nodes in network 400 can advertise their respective nodal-segment IDs, adjacency-segment IDs and service-segment IDs to all other nodes in the network. For example, each SR or SR/LDP node may advertise its nodal-segment ID/node prefix mapping, and its adjacency-segment ID/adjacency ID mapping(s) to all other nodes. If an SR or SR/LDP offers a service, the node may also advertise a service-segment ID/service mapping. LDP nodes 406 and 414 will not understand the segment ID advertisements they receive. One skilled in the art understands that SR nodes and SR/LDP nodes do not receive segment ID advertisements from LDP nodes.

Each SR/LDP node in a hybrid network like that shown in FIG. 4 can store information indicating whether any of its directly coupled neighbors are LDP nodes (e.g., LDP nodes 406 and 414). In one embodiment, each SR/LDP node may create an LDP interface table in memory, which indicates those interfaces of the SR/LDP node that are directly coupled or adjacent to LDP nodes, and those interfaces that are not. For example SR/LDP node 404 can create an LDP interface table 450 in memory, which indicates that only interface IDs 2 and 3 are directly coupled to LDP nodes (i.e., LDP nodes 406 and 414). Each SR/LDP node can create an LDP interface table using the node type identifiers of the node prefix advertisements mentioned above. Other methods for creating LDP interface tables are contemplated.

LDP and SR/LDP nodes in network 400 can bi-directionally exchanging label mappings using standard LDP. The exchange enables the creation of LDP forwarding tables and thus LSPs between SR/LDP nodes via LDP nodes in network 400. For the purposes of explanation only, these LSPs will be referred to as core LSPs, and the SR/LDP nodes of these core LSPs will be referred to as core source nodes and/or core destination nodes. It is noted that in an alternative embodiment, core LSPs can facilitate transmission of packets between a source SR/LDP node and a destination SR node via a core LSP. However, the remaining disclosure will presume core LSPs between SR/LDP nodes, it being understood the disclosure should not be limited thereto.

Core LDP nodes in network 400 can create their LDP forwarding tables in the same manner as the LDP nodes of FIG. 1. As a result these LDP forwarding tables can map incoming labels to respective outgoing label/egress interface ID pairs. These mappings enable label swapping during packet forwarding.

LDP forwarding tables in SR/LDP nodes in one embodiment do not map incoming labels to respective outgoing label/egress interface ID pairs. Each SR/LDP node can create an LDP forwarding table that maps outgoing labels/egress interface ID pairs to respective node prefixes for destination SR/LDP nodes that can be reached via respective core LSPs. For example, SR/LDP node 404 can create an LDP forwarding table that maps outgoing label L1/egress interface ID 2 to node prefix D, and outgoing label L2/egress interface ID 3 to node prefix H. These LDP forwarding table mappings enable SR/LDP node 404 to forward packets on separate core LSPs to SR/LDP nodes 408 and 416. In this embodiment, the LDP forwarding tables for SR/LDP nodes enable label push and pop operations as will be more fully described below.

Each SR and SR/LDP node in a hybrid network can create an SR forwarding table. The SR nodes can create their SR forwarding tables in the same manner as described above with respect to FIG. 2A. The SR/LDP nodes, however, may create their SR forwarding tables in a slightly different manner. The SR forwarding tables of SR/LDP nodes enable interoperability between SR nodes and LDP nodes.

Figure 5A:
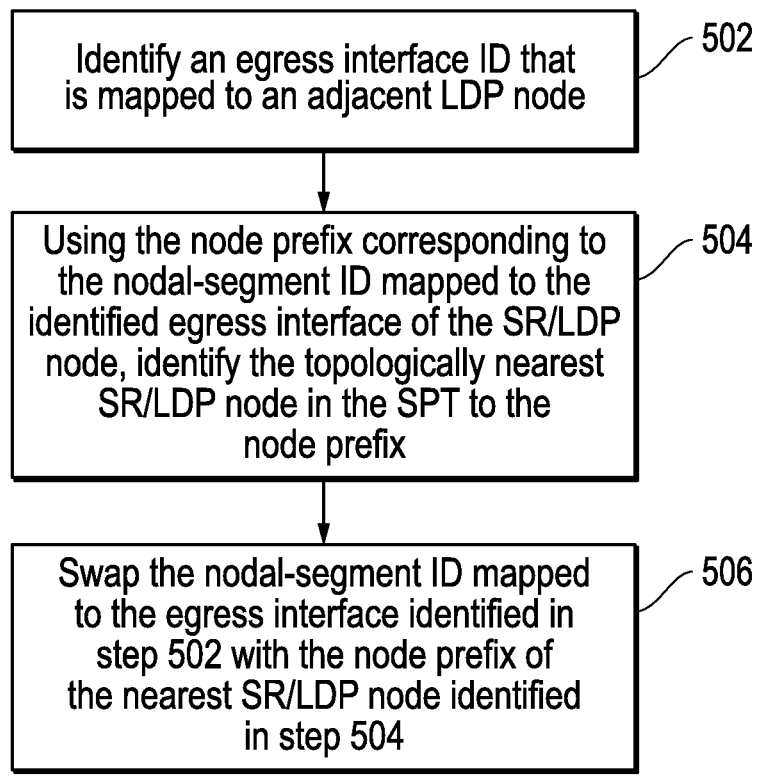
FIG. 5A is a flow chart illustrating an example process implemented by a node in the network of in FIG. 4.

Like SR nodes, SR/LDP nodes can identify the SPT egress interface ID for each SR or SR/LDP node using the node's advertised node prefix. The SPT egress interface ID is then mapped in the SR forwarding table to the nodal-segment ID that is assigned to the SR or SR/LDP node. After nodal-segment IDs are mapped to SPT egress interface IDs, the SR forwarding table should be updated to account for intervening LDP nodes. More particularly the SR forwarding table should be updated to account for SPT egress interface IDs that are adjacent to LDP nodes. In one embodiment, SR/LDP nodes can use their LDP interface tables (e.g., table 450) mentioned above to identify SPT egress interface IDs that are mapped in the SR forwarding table to adjacent LDP nodes. When such an SPT egress interface ID is identified, the SR/LDP node can use its routing table to identify the topologically nearest or first SR/LDP node in the SPT. The SPT egress interface ID is then swapped in the SR forwarding table with the node prefix for the nearest SR/LDP node in the SPT. FIG. 5A is an example method for updating the SR forwarding table.

The SR forwarding table updating method of FIG. 5A starts with step 502 in which the SR/LDP node identifies an SPT egress interface ID that is mapped to an adjacent LDP node. The identified SPT egress interface ID is mapped to a nodal-segment ID in the SR forwarding table. SR/LDP node received an advertisement that maps this nodal-segment ID to a node prefix. In step 504, using this node prefix and a topology map of network 400, the SR/LDP node identifies the nearest SR/LDP in the SPT to the node prefix. Thereafter, the SR/LDP node swaps the nodal-segment ID mapped to the SPT egress interface identified in step 502 with the node prefix of the SR/LDP node identified in step 504. SR/LDP node can use the LDP interface table to identify, if any, additional SPT egress interface IDs in the SR forwarding table that are mapped to adjacent LDP nodes. The method shown in FIG. 5A can be applied to all SPT egress interface IDs in the SR forwarding table that are mapped to adjacent LDP nodes. Once this process has completed, the SR forwarding table may include several nodal-segment IDs that are mapped to node prefixes. FIGS. 5B and 5C represent an example SR forwarding table for SR/LDP node 404 before and after the process of FIG. 5A is applied.

SR nodes within the hybrid provider network 400, including PE SR nodes, can forward packets in accordance with the process described with reference to FIG. 3A or 3B. SR/LDP nodes may employ a slightly different process. In general, to enable interoperability between core SR nodes and core LDP nodes, an SR/LDP node can attach or push a label onto a segment ID stack for a packet that is received from an SR node before the SR/LDP forwards the packet to an LDP node, and an SR/LDP node can remove or pop a label from the segment ID stack attached to a packet that is received from an LDP node before the SR/LDP node forwards the packet to an SR node.

Figure 6:
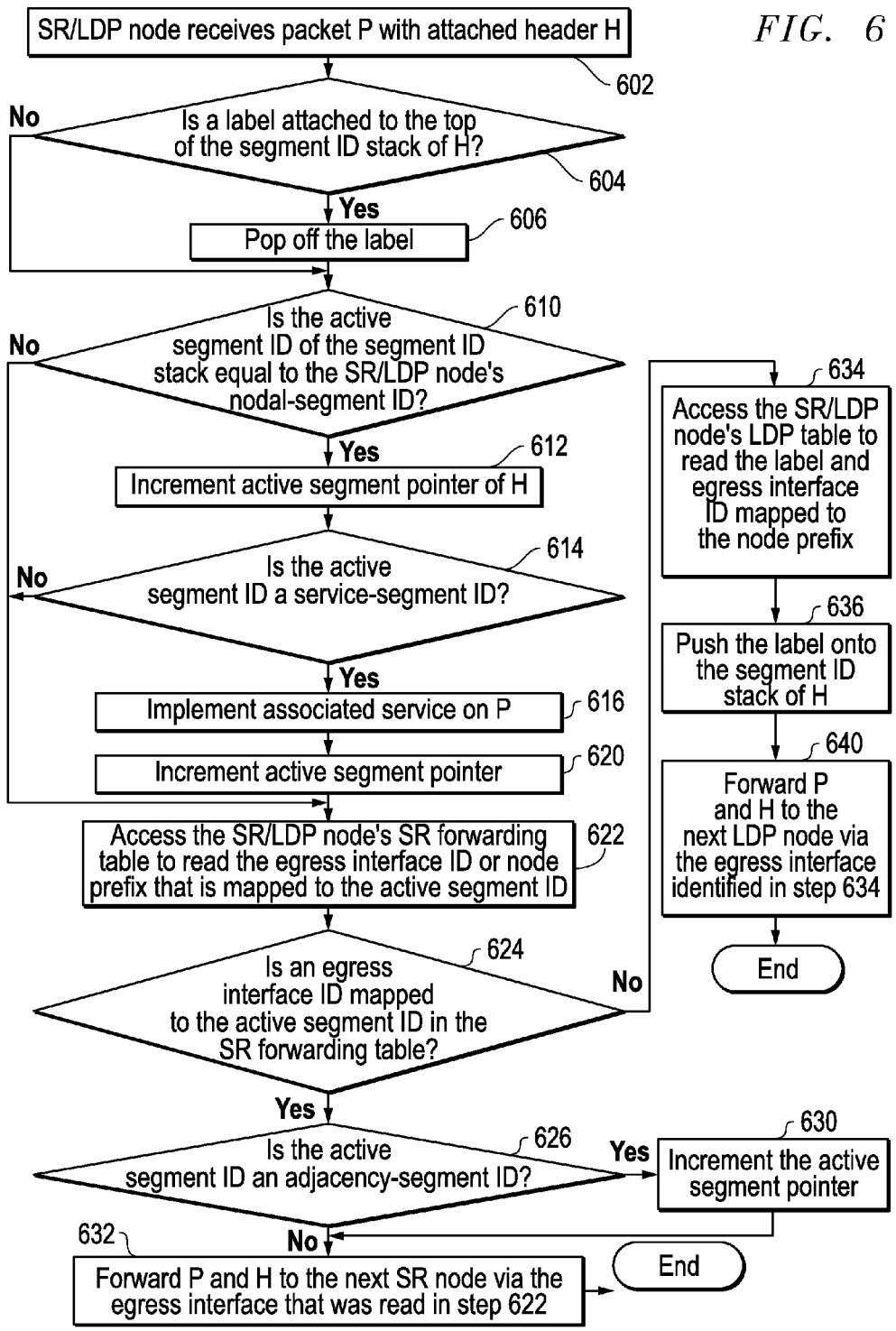
FIG. 6 is a flow chart illustrating an example process implemented by a node in the network of in FIG. 4.

With continuing reference to FIG. 4, FIG. 6 illustrates an example process employed by SR/LDP nodes to enable packet forwarding between SR nodes and LDP nodes. The process in FIG. 6 begins when an SR/LDP node, such as SR/LDP node 404, receives a packet P with attached header H, an example of which is shown above in FIG. 4. In general, if the packet P and header H are received from an SR node, the header H will lack a label, and if the packet P and header H are received from an LDP node, the header H will contain a label. In the example shown in FIG. 4, packet P and header H is received by node 404 from SR node 402, and as a result header H lacks a label.

The SR/LDP node determines in step 604 whether a label has been added to the header H. In one embodiment, a label can be added to a header by pushing the label on the segment ID stack. There are numerous ways in which step 604 can be implemented. For example, the SR/LDP can presume that a label is attached if the SR/LDP node receives the packet P via an interface that is adjacent to an LDP node. The LDP interface table mentioned above can be used by the SR/LDP node to make a determination of whether a packet was received at an interface adjacent to an LDP node. Alternatively, in the embodiment where the labels are pushed onto segment ID stacks and are selected from a range that is distinct from the range from which nodal-segment IDs, adjacency-segment IDs, and service-segment IDs are selected, the SR/LDP node can determine the first entry of the segment ID stack is a label if the first entry falls within the range reserved for labels. Ultimately, if the SR/LDP node determines header H contains a label, the label is removed or popped off in step 606. Thereafter, or in response to determining that header H lacks a label, the process proceeds to step 610.

Step 610 is similar to step 304 shown within FIG. 3A. Indeed, many of the steps shown in FIG. 6 are similar to steps shown in FIG. 3A. In step 610, the forwarding engine within the SR/LDP node determines whether the active segment ID of the segment ID stack is equal to the SR/LDP node's nodal-segment ID. Again, it is noted that header H includes a pointer that identifies the active segment ID. The pointer may change as the packet flows through the SSP. If it is determined in step 610 that the active segment ID is equal to the SR/LDP node's nodal-segment ID, the process proceeds to step 612 where the SR/LDP node increments the active segment pointer. The SR/LDP node then determines whether the active segment ID is a service-segment ID for a service offered by the SR/LDP node. If it is, that service is implemented on packet P by the SR/LDP node, and the active segment pointer is incremented in step 620.

If the active segment ID is not a service-segment ID determined in step 614, or if the active segment ID does not equal the SR/LDP node's nodal-segment ID in step 610, the process proceeds to step 622 where the SR/LDP node accesses its SR forwarding table to read the egress interface ID or a node prefix mapped to the active segment ID. In step 624, the SR/LDP node determines whether an egress interface ID or node prefix is mapped to the active segment ID in the SR forwarding table. If the active segment ID is mapped to an egress interface ID, then the SR/LDP node determines in step 626 whether the active segment ID is an adjacency-segment ID or a nodal-segment ID. If the active segment ID is an adjacency-segment ID, the process follows to step 630 and the SR/LDP node increments the active segment pointer before forwarding packet P and attached header H to the next node via the egress interface mapped to the active segment ID in the SR forwarding table as shown in step 632. If it is determined in step 626 that the active segment ID is a nodal-segment ID, then the SR/LDP node proceeds to forward packet P and attached header H without incrementing the pointer as shown in step 632.

If the SR/LDP node determines in step 624 that a node prefix is mapped to the active segment ID, then the process proceeds to step 634 where the SR/LDP node accesses the SR/LDP node's LDP forwarding table to read the label and egress interface ID mapped to the node prefix. The SR/LDP node then adds or pushes that label onto the segment ID stack within header H. Thereafter, the SR/LDP node forwards the packet P and attached header H to the next LDP node via the egress interface identified in step 634, and the process ends. FIG. 4 illustrates an example label L1 pushed onto the stack of example header H before SR/LDP node 404 forwards packet P and header H to LDP node 406 in accordance with step 640.

Figure 7:
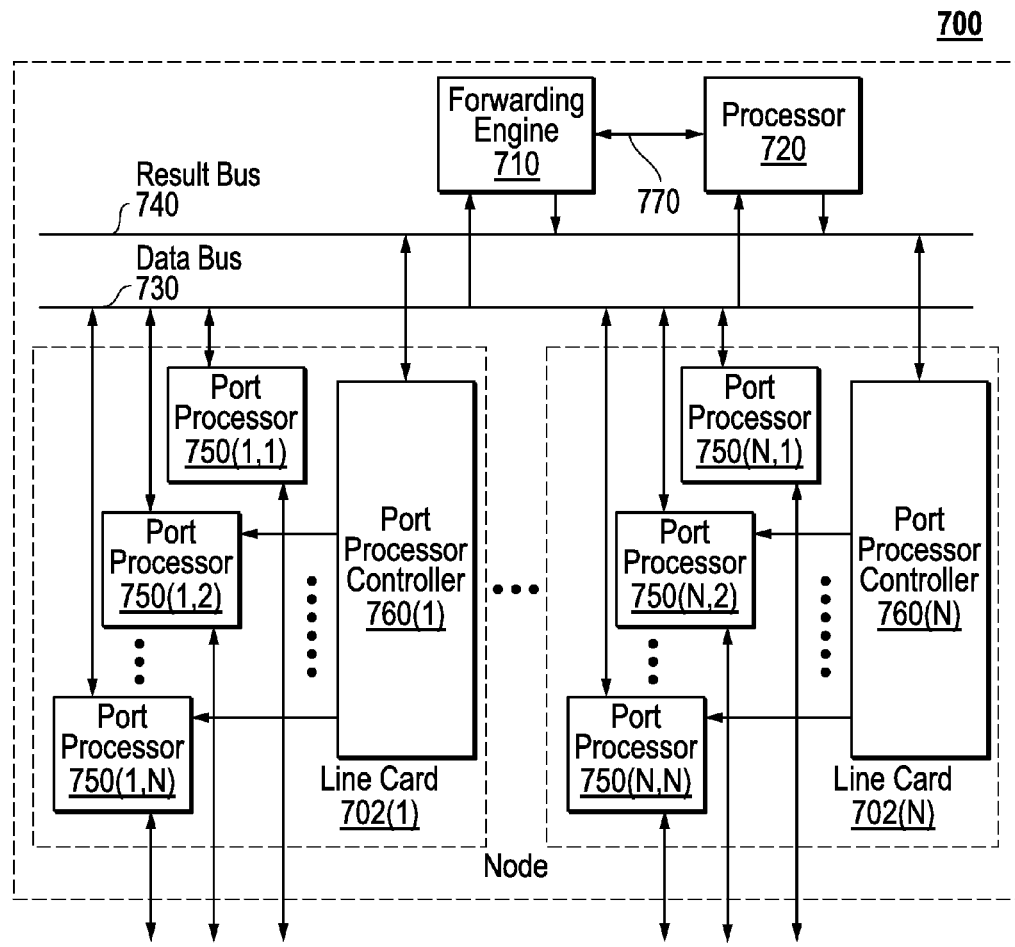
FIG. 7 is a block diagram illustrating certain components of an example node that can be employed in the network of FIG. 1, 2A or 4.

FIG. 7 is a block diagram illustrating certain additional and/or alternative components of nodes that can be employed in the networks shown in FIGS. 1, 2A, and 4. In this depiction, node 700 includes a number of line cards (line cards 702(1)-(N)) that are communicatively coupled to a forwarding engine or packet forwarder 710 and a processor 720 via a data bus 730 and a result bus 740. Line cards 702(1)-(N) include a number of port processors 750(1,1)-(N,N) which are controlled by port processor controllers 760(1)-(N). It will also be noted that forwarding engine 710 and processor 720 are not only coupled to one another via data bus 730 and result bus 740, but are also communicatively coupled to one another by a communications link 770.

The processors 750 and 760 of each line card 702 may be mounted on a single printed circuit board. When a packet or packet and header are received, the packet or packet and header may be identified and analyzed by router 700 in the following manner. Upon receipt, a packet (or some or all of its control information) or packet and header is sent from the one of port processors 750(1,1)-(N,N) at which the packet or packet and header was received to one or more of those devices coupled to data bus 730 (e.g., others of port processors 650(1,1)-(N,N), forwarding engine 710 and/or processor 720). Handling of the packet or packet and header can be determined, for example, by forwarding engine 710. For example, forwarding engine 710 may determine that the packet or packet and header should be forwarded to one or more of port processors 750(1,1)-(N,N). This can be accomplished by indicating to corresponding one(s) of port processor controllers 760(1)-(N) that the copy of the packet or packet and header held in the given one(s) of port processors 750(1,1)-(N,N) should be forwarded to the appropriate one of port processors 750(1,1)-(N,N). In addition, or alternatively, once a packet or packet and header has been identified for processing, forwarding engine 710, processor 720 or the like can be used to process the packet or packet and header in some manner or add packet security information, in order to secure the packet. On a node sourcing such a packet or packet and header, this processing can include, for example, encryption of some or all of the packet's or packet and header's information, the addition of a digital signature or some other information or processing capable of securing the packet or packet and header. On a node receiving such a processed packet or packet and header, the corresponding process is performed to recover or validate the packet's or packet and header's information that has been thusly protected.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

We claim:

1. A method comprising:
receiving a packet with an attached first segment ID, wherein
the packet is received by a segment routing/label distribution protocol (SR/LDP) node,
the attached first segment ID is advertised in a segment ID advertisement, and
the attached first segment ID identifies a nodal segment or an adjacency segment;
attaching a first label to the packet; and
forwarding the packet with the attached first label and the attached first segment ID toward a first node, wherein the first node comprises a label distribution protocol (LDP) node.

2. The method of claim 1 further comprising the first node swapping the first label with a second label, and the first node forwarding the packet with attached second label and the attached first segment ID to a second node.

3. The method of claim 2 further comprising the second node detaching the second label from the packet, and the second node forwarding the packet with the attached first segment ID to a third node.

4. The method of claim 3 further comprising the third node forwarding the packet with attached first segment ID to a fourth node via shortest path to the fourth node, wherein the first, second, third, and fourth nodes are contained in a provider network, and wherein the first segment ID uniquely identifies the fourth node within the provider network.

5. The method of claim 1 wherein the first segment ID is attached to the packet via a header that comprises a plurality of segment IDs including the first segment ID, wherein the first segment ID is assigned to a node in a provider network.

6. The method of claim 5 wherein the node is the first node.

7. The method of claim 1 further comprising:
accessing a memory structure using the first segment ID;
reading the first label in response to accessing the memory structure, wherein the first label is mapped directly or indirectly to the first segment ID in the memory structure.

8. The method of claim 1, wherein
the receiving is performed by a SR/LDP node in a hybrid network, and
the hybrid network comprises one or more LDP nodes and one or more SR nodes.

9. An apparatus comprising:
a first node comprising an input interface configured to receive a packet with an attached first segment ID, wherein
the first node comprises a segment routing/label distribution protocol (SR/LDP) node,
the first segment ID is advertised in a segment ID advertisement, and
the attached first segment ID identifies a nodal segment or an adjacency segment;
the first node comprising a memory structure that maps the first segment ID directly or indirectly to a first label;
the first node comprising a module configured to attach the first label to the packet; and
the first node comprising an output interface configured to transmit the packet to a second node with the attached first label and the attached first segment ID, wherein the second node comprises a label distribution protocol (LDP) node.

10. The apparatus of claim 9 further comprising:
a second node comprising an input interface configured to receive the packet with the attached first segment ID and the attached first label;
the second node comprising a memory structure that maps the first label to a second label;
the second node comprising a module configured to swapping the first label attached to the packet with the second label;
an output interface configured to transmit the packet with the attached second label and the attached first segment ID.

11. The apparatus of claim 10 further comprising:
a third node comprising an input interface configured to receive the packet with the attached first segment ID and an attached third label;
the third node comprising a second module for detaching the third label from the packet; and
the third node comprising an output interface for transmitting the packet with attached first segment ID.

12. The apparatus of claim 11 further comprising:
a fourth node comprising an input interface configured to receive the packet with the attached first segment ID;
the fourth node comprising a memory structure that maps the first segment ID to an output interface identification;
the fourth node comprising an output interface for transmitting the packet with the attached first segment ID;
wherein the output interface of the fourth node corresponds to the output interface identification.

13. The apparatus of claim 12 where the first, second, third, and fourth nodes are contained in a provider network, and wherein the first segment ID uniquely identifies the fourth node within the provider network.

14. The system of claim 12 where the first, second, third, and fourth nodes are contained in a provider network, and wherein the first segment ID uniquely identifies the fourth node within the provider network.

15. The apparatus of claim 9 wherein the first segment ID is attached to the packet via a header that comprises a plurality of segment IDs including the first segment ID, wherein the first segment ID is assigned to a node in a provider network.

16. A system comprising:
a first node comprising an input interface configured to receive a packet with an attached first segment ID, wherein
the first node comprises a segment routing/label distribution protocol (SR/LDP) node,
the first segment ID is advertised in a segment ID advertisement, and
the attached first segment ID identifies a nodal segment or an adjacency segment;
the first node comprising a means for mapping the first segment ID directly or indirectly to a first label;
the first node comprising a means for attaching the first label to the packet; and
the first node comprising an output interface configured to transmit the packet to a second node with the attached first label and the attached first segment ID, wherein the second node comprises a label distribution protocol (LDP) node.

17. The system of claim 16 further comprising:
a second node comprising an input interface configured to receive the packet with the attached first segment ID and the attached first label;
the second node comprising a means for mapping the first label to a second label;

the second node comprising a means for swapping the first label attached to the packet with the second label; and the second node comprising an output interface configured to transmit the packet with the attached second label and the attached first segment ID.

18. The system of claim 17 further comprising:

a third node comprising an input interface configured to receive the packet with the attached first segment ID and an attached third label;

the third node comprising a means for detaching the third label from the packet; and the third node comprising an output interface for transmitting the packet with attached first segment ID.

19. The system of claim 17 further comprising:

a fourth node comprising an input interface configured to receive the packet with the attached first segment ID;

the fourth node comprising a means for mapping the first segment ID to an output interface identification;

the fourth node comprising an output interface for transmitting the packet with the attached first segment ID;

wherein the output interface of the fourth node corresponds to the output interface identification.

20. The system of claim 16 wherein the first segment ID is attached to the packet via a header that comprises a plurality of segment IDs including the first segment ID, wherein the first segment ID is assigned to a node in a provider network.

* * * * *